United States Patent
Maruyama

(10) Patent No.: US 6,717,366 B1
(45) Date of Patent: Apr. 6, 2004

(54) APPARATUS FOR CONTROLLING POWER SUPPLY FOR USE IN MOTOR VEHICLE

(75) Inventor: Akinori Maruyama, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/671,697

(22) Filed: Sep. 28, 2000

(30) Foreign Application Priority Data

Sep. 30, 1999 (JP) .......................................... 11-278640

(51) Int. Cl.⁷ ................................................ B60Q 1/52
(52) U.S. Cl. ...................... 315/82; 315/200 A; 340/471
(58) Field of Search ............................ 315/82, 80, 77, 315/200 A, 209 R, 129–133, 136; 307/10.1, 10.8; 340/471, 475–478

(56) References Cited

U.S. PATENT DOCUMENTS

| | | | | |
|---|---|---|---|---|
| 3,541,388 A | * | 11/1970 | Dodge et al. ............... | 315/140 |
| 4,156,166 A | * | 5/1979 | Shapiro et al. ......... | 315/209 R |
| 4,230,970 A | * | 10/1980 | Potter et al. ................. | 315/307 |
| 4,259,659 A | * | 3/1981 | Ariyoshi et al. ............ | 340/458 |
| 5,758,741 A | * | 6/1998 | Tomioka ..................... | 180/446 |
| 5,877,681 A | * | 3/1999 | Williams et al. ............ | 340/468 |

* cited by examiner

Primary Examiner—Don Wong
Assistant Examiner—Ephrem Alemu
(74) Attorney, Agent, or Firm—Armstrong, Westerman & Hattori, LLP

(57) ABSTRACT

An apparatus for controlling power supply for use in a vehicle causes a lamp load to blink by power supply from an in-vehicle battery or generator. The power to be supplied to the lamp load is stepwise decrease whenever a blinking time of the lamp load passes prescribed times. In this configuration a lamp load can blink for a longer time without saving power excessively.

6 Claims, 4 Drawing Sheets

APPARATUS FOR CONTROLLING POWER SUPPLY FOR USE IN MOTOR VEHICLE

BACKGROUND OF THE INVENTION

1. Field of the Invention

The present invention relates to an apparatus for controlling power supply for use in a motor vehicle, and more particularly to an apparatus for controlling power supply for used in a motor vehicle which causes a lamp load to blink by power supply from a in-vehicle batter or power generator.

2. Description of the Related Art

A hazard lamp is an example of the lamp load which blinks by power supply from the in-vehicle battery or power generator. The hazard lamp serves to inform other vehicles that one's own vehicle is parking. Therefore, the hazard lamp is often caused to blink for a long time when the engine is stopping and idling. Specifically, the hazard lamp is caused to blink for a long time when power is not generated by a power generator or when the power consumption by the hazard lamp is more than the power generated (even if the power generation is executed) i.e. when the charging of an in-vehicle battery is not entirely executed. Thus, there was a possibility that the remaining quantity of the battery lowers so that the engine cannot be started, i.e. battery is entirely discharged. Even when the battery is not discharged, there was a possibility that the remaining quantity of the battery lowers to the verge of discharging of the battery, and the battery is charged again when the engine is started. Such a repetition of the abrupt increase/decrease of the remaining quantity promotes the deterioration of the in-vehicle battery as compared with a normal case.

In order to obviate the discharging of the battery or the deterioration of the in-vehicle battery, there is proposed that if the hazard lamp continuously blinks for a prescribed period of time or longer, the light quantity is reduced so that the hazard lamp is caused to blink with reduced power. However, since the hazard lamp serves to inform other vehicles of the presence of one's own vehicle, the hazard lamp is preferably caused to blink with no reduced light. Particularly, when one's own vehicle parks on a road with a few street lamps at night, the hazard lamp is preferably conspicuous so that the blinking of the hazard lamp can be recognized by other vehicles located far away. However, in the light reduction of the hazard lamp at one step as described above, the light reduction is excessively carried out to cause the hazard lamp to blink by reduced power even when the remaining quantity of the invehicle battery is not lowered greatly such as when the blinking of the hazard lamp succeeds for a prescribed time. In this case, the power is saved exaggeratedly.

SUMMARY OF THE INVENTION

An object of the present invention is to provide an apparatus for controlling power supply for use in a vehicle which permits a lamp load to blink for a longer time without saving power excessively by stepwise reducing the power to be supplied to the lamp load according to the remaining quantity of an in-vehicle battery.

In order to attain the above object, in accordance with the invention, as shown in FIG. 1 showing the basic arrangement of the present invention, there is provided an apparatus for controlling power supply for use in a vehicle for causing a lamp load to blink by power supply from an in-vehicle battery 101 or generator ALT, comprising: means 100 for stepwise decreasing power to be supplied to the lamp load whenever a blinking time of the lamp load passes prescribed times.

In this configuration, the lamp load can blink for a longer time, and the power supply can be saved according to the remaining quantity of the battery.

Preferably, the lamp load is caused to blink by a pulse-like power source voltage, and the power decreasing means comprises means 104a for stepwise decreasing a duty ratio of the pulse-like voltage whenever the blinking time of the lamp load passes the prescribed times.

In this configuration, with the brightness of the lamp load being maintained, the power to be supplied to the lamp load can be easily saved.

Preferably, the duty ratio is decreased to a minimum value enough to recognize the lamp load visually. This avoids wasteful power consumption when the hazard lamp can not be visually recognized.

The above and other objects and features of the invention will be more apparent from the following description taken in conjunction with the accompanying drawings.

BRIEF DESCRIPTION OF THE DRAWINGS

FIGS. 3A and 3B are timing charts each showing the relationship between an turn-on operation signal and a driving signal;

DESCRIPTION OF THE PREFERRED EMBODIMENT

Figure 1:
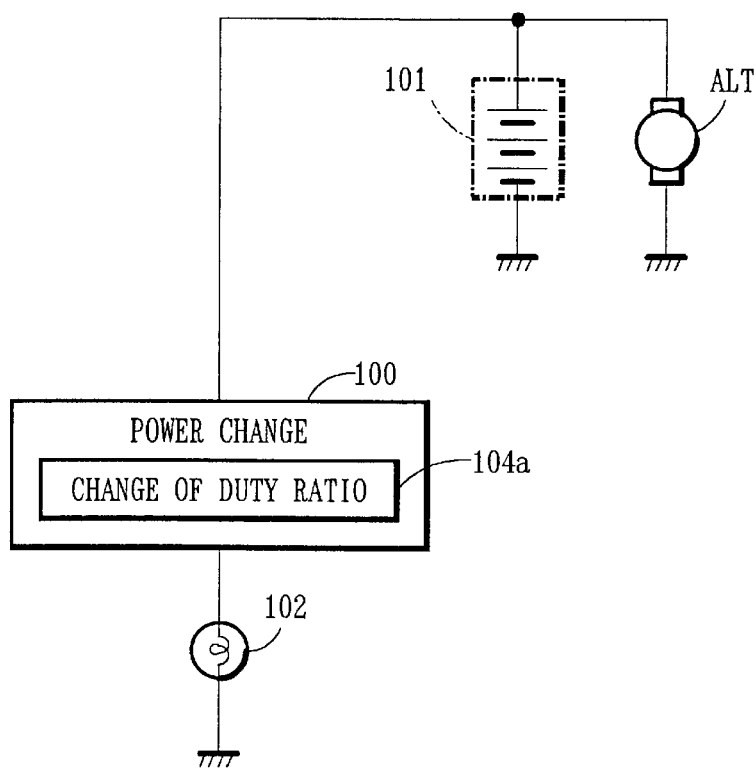
FIG. 1 is a block diagram of a basic arrangement of an apparatus for controlling the power supply for a motor vehicle.

Now referring to the drawings, an explanation will be given of an embodiment of the apparatus for controlling the power supply for use in a motor vehicle according to the invention.

Figure 2:
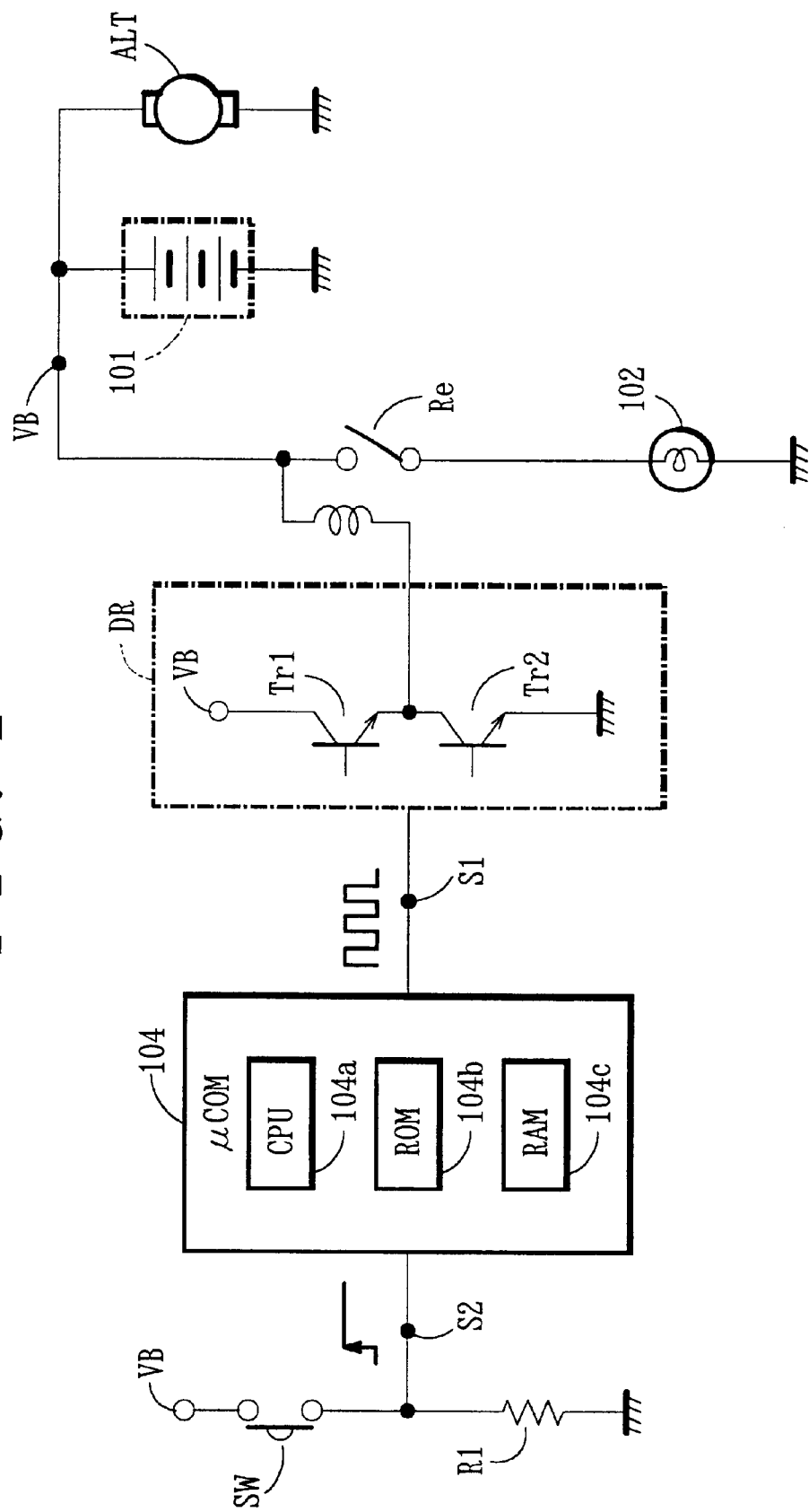
FIG. 2 is a circuit diagram showing an embodiment of the apparatus for controlling the power supply for a motor vehicle.

FIG. 2 is a block diagram showing an embodiment of the apparatus for controlling the power supply for use in a motor vehicle according to the invention. In FIG. 2, a power source voltage VB from an in-vehicle battery 101 is supplied to a hazard lamp 102 serving as a lamp load via a relay Re. The relay Re is composed of a relay coil and a relay contact, which is normally opened and closed when a current f lows through the relay coil. The relay coil is connected to a driving circuit DR which is controlled by a microcomputer (hereinafter referred to as a μ-COM). When the engine is operating, the hazard lamp 102 is supplied with not the power source from the in-vehicle battery 101 but the DC power converted from the AC power of a AC power generator ALT which generates power by engine driving.

The driving circuit DR is composed of an NPN switching (SW) transistor Tr1 with a collector connected to the power source VB and another NPN switching (SW) transistor Tr2 with a collector connected to the emitter of the SW transistor Tr1. The junction of the emitter of the SW transistor To and the collector of the SW transistor Tr2 is connected to the relay coil of the relay Re.

With the SW transistor Tr1 turned on and the SW transistor Tr2 turned off, the driving circuit DR applies the power source voltage VB to the relay coil of the relay Re so that a current is passed through the relay coil, thereby closing the relay contact. On the other hand, with the SW transistor Tr1 turned off and the SW transistor Tr2 turned on, the driving circuit DR stops the application of the power source to the relay coil so that the current flowing through the relay coil is stopped, thereby opening the relay contact. The driving circuit DR is adapted to apply the power source voltage VB to the relay coil of the relay Re in response to the output of the driving signal S1 at an H level which is produced from the $\mu$ COM 104, and also stop the application of the power source voltage VB to the relay coil in response to stopping of the output of the driving signal S1. Namely, when the hazard lamp 102 is supplied with the power source voltage VB in response to the output of the driving signal S1 from the $\mu$ COM 104, it turns on, whereas when the hazard lamp 102 is not supplied with the power source voltage VB in response to stopping of the output of the driving signal S1, it turns off.

The $\mu$ COM 104 incorporates a CPU 104a for performing various kinds of processing according to a program, an ROM which is a read-only-memory for storing programs for the processing by the CPU 104a and RAM 104c which a readable/writable memory having a work area used for the processing by the CPU 104a and data storing area for storing various data. These components are connected to one another by bus lines. The $\mu$ COM 104 is connected to the one end of an external switch SW the one terminal of which is connected to ground through a resistor R1 and the other terminal of which is connected to the power source voltage VB. In this case, when the switch SW is switched on, an ON operation signal S2 at the H level is supplied to the $\mu$ COM 104.

The CPU 104a within the $\mu$ COM 104 performs the blinking processing of supplying a pulse-like driving signal S1 (FIG. 3B) to the driving circuit DR in response to the output of the ON operation signal S2 (FIG. 3A), thereby supplying the pulse-like power source voltage VB to the hazard lamp 102 to blink. The CPU 104a also performs the processing of measuring or counting the time while the hazard lamp 102 blinks. Further, the CPU 104a serves as a duty ratio changing means. Namely, whenever the measured blinking time of the hazard lamp 102 passes a prescribed time, the CPU 104a performs the processing of stepwise decreasing the duty ratio of the driving signal S1, i.e. that of the pulse-like power source voltage VB supplied to the hazard lamp 102 synchronously with the driving signal S1.

Figure 4:
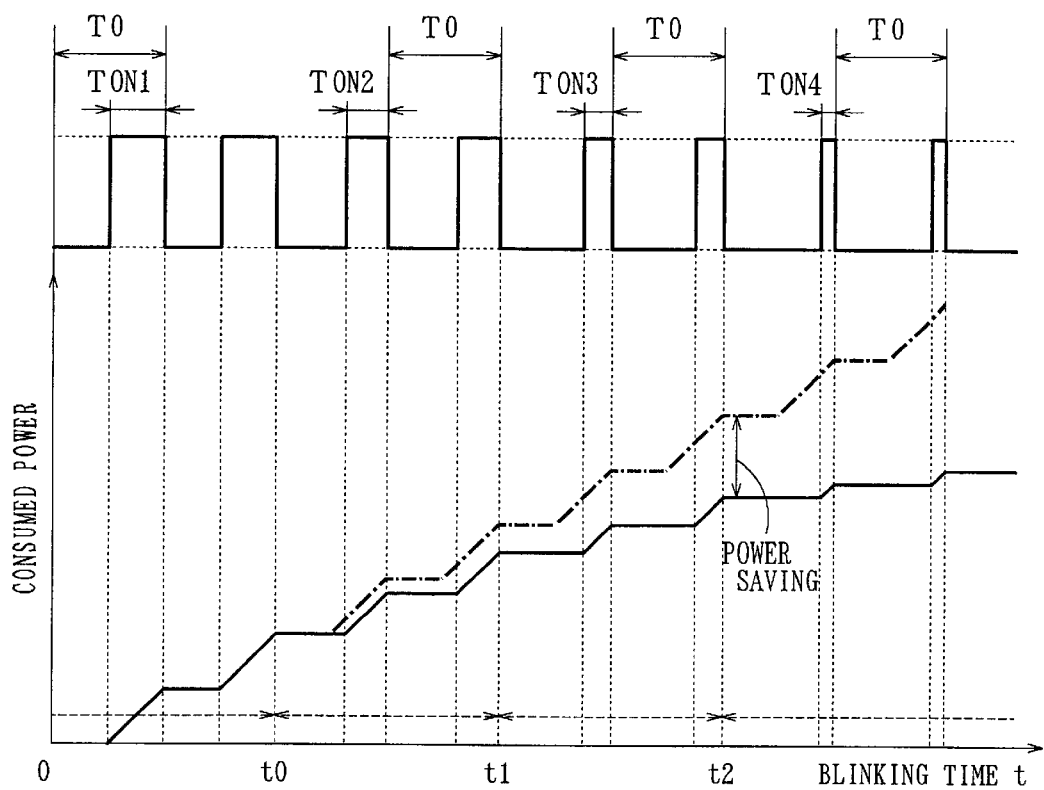
FIG. 4 is a timing chart for explaining the operation of the apparatus for controlling the power supply for use in a motor vehicle shown in FIG. 2.

Referring to the timing chart of FIG. 4, an explanation will be given of the operation of the apparatus of controlling power supply for use in a vehicle according to the invention. First, the CPU 104a produces the driving signal S1 having a duty ratio of ½ (Ton1/To=½ as seen from FIG. 4) in response to the ON operation signal S2 to cause the hazard lamp 102 to blink, and starts to measure the blinking time t of the hazard lamp 102. After the measurement is started, the blinking time t passes a prescribed time t0, the CPU 104a decreases the duty ratio of the driving signal S1 from ½ to ⅓ (Ton2/To=⅓). Thus, the lighting-up time Ton and consumed power of the hazard lamp 102 is decreased to ⅔ of that in the case of the duty ratio of ½. Thereafter, when the blinking time passes prescribed times t1 and t2, the CPU 104a changes the duty ratio of the driving signal S1 from ⅓ to ¼ (Ton3/To=⅓) and from ¼ to ⅛ (Ton4/To =⅛), respectively. Accordingly, the power consumption can be reduced as compared with the case where the hazard lamp 102 continues to blink at the duty ratio of ½ as indicated by broken line in FIG. 4. As apparent from the above description, the CPU 104a, driving circuit DR and relay RE constitutes a power reducing means.

The duty ratio is decreased to a minimum value, e.g. ⅛ enough to recognize the hazard lamp 102 visually. The duty ratio is fixed to this value so that the blinking time of the hazard lamp is not further shortened. Thereafter, the power consumption occurs at the blinking time due to the fixed duty ratio, e.g. ⅛. This avoids wasteful power consumption when the hazard lamp can not be visually recognized.

In the apparatus for controlling power supply for use in a vehicle according to the invention, even while the power generator ALT stops or the engine is idling so that the power consumption of the hazard lamp 102 exceeds the power quantity generated by the power generator ALT, i.e. the remaining quantity of the in-vehicle battery 101 is reducing, when the blinking time t of the hazard lamp 102 passes the prescribed times t0, t1 and t2, the duty ratio is stepwise decreased, thereby stepwise saving the power consumption. This permits the hazard lamp to blink for a long time so that the discharging or deterioration of the in-vehicle can be prevented. In addition, since the duty ratio is stepwise decreased according to elapse of the blinking time of the hazard lamp 102 or the remaining quantity of the in-vehicle battery 101, the blinking time will not be shortened excessively that the power consumption can be saved suitably.

The apparatus for controlling the power supply for use in a vehicle according to the invention saves the power consumption by only stepwise decreasing the duty ratio by the processing of the CPU 104a, and therefore is not required to lower the voltage to be supplied to the hazard lamp. This permits the manufacturing cost of apparatus to be reduced. The power saving based on the changing of the duty ratio according to the invention can maintain the brightness of the hazard lamp. This provides higher visual recognition of the hazard lamp than the power saving based on the reducing the voltage to be supplied to the hazard lamp.

Figure 5:
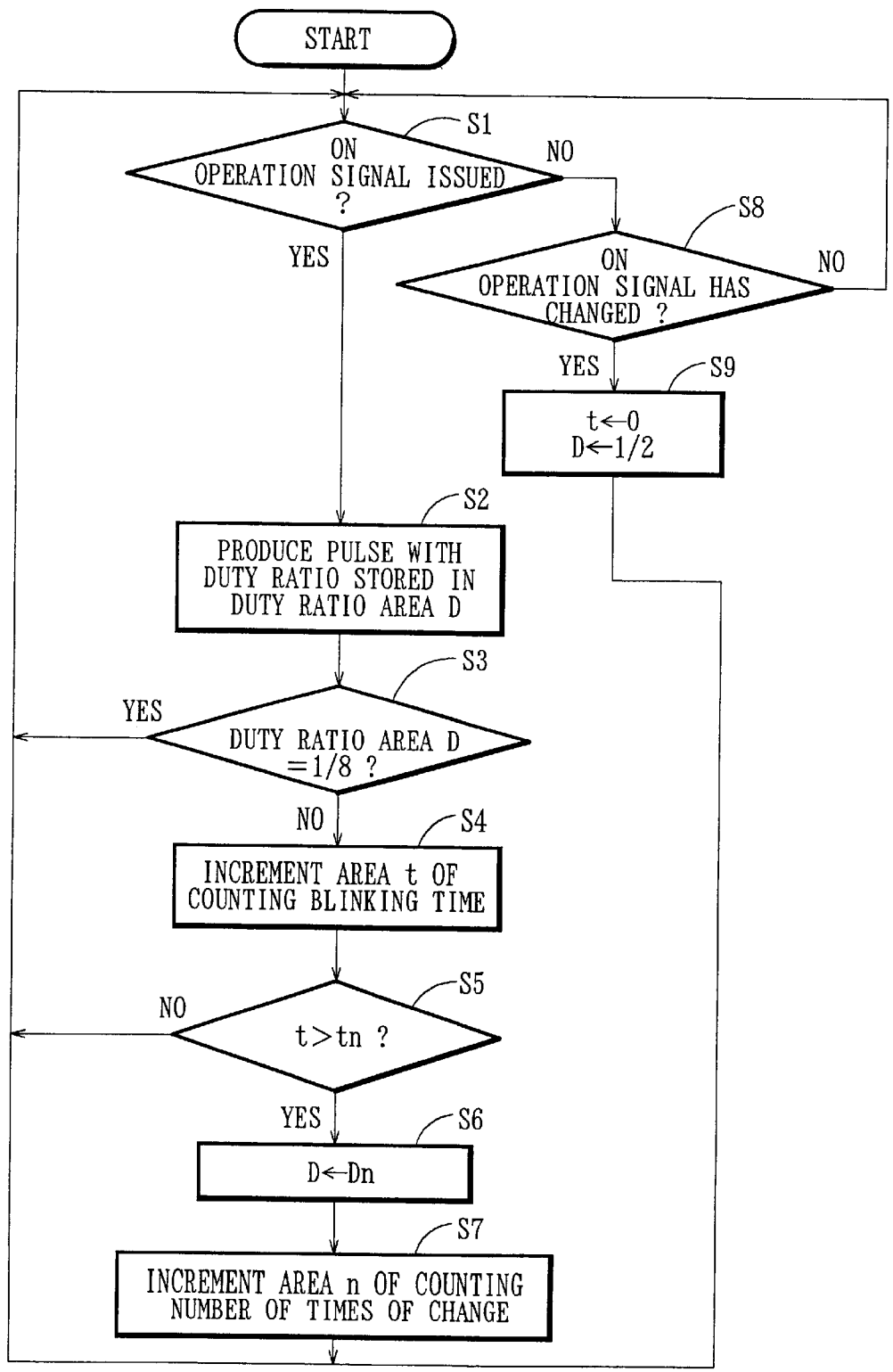
FIG. 5 is a flowchart showing the processing procedure of a CPU constituting the apparatus for controlling the power supply for use in a motor vehicle shown in FIG. 2.

Referring to the flowchart of FIG. 5 showing the procedure of the CPU 104a in the $\mu$ COM 104, an explanation will be given of the operation of the apparatus for controlling power supply for a vehicle. The CPU 104a starts the processing when the power source voltage VB of the in-vehicle battery 101 is turned on. In an initial step not shown, initial settings are given to various areas formed on the RAM 104c within the $\mu$ COM 104. Specifically, the area D of the duty ratio of the driving signal S1 is set at ½; the counting area t of counting the blinking time of the hazard lamp 102 is set at 0; and the area n of the number of times of changing the duty ratio of the driving signal S1 is set at 0.

In first step S1, it is decided on whether or not the ON operation signal S2 has been issued. If YES (as a result that the switch SW has been turned on, the ON operation signal S2 is issued), the processing proceeds to step S2. In step S2, the pulse having the duty ratio stored in the duty ratio area D is produced as a driving signal S1. In step S3, it is determined whether or not the duty ratio area is ⅛ which is a minimum duty ratio in a range where the hazard lamp 102 can be visually recognized. If YES (the duty ratio area D is ⅛) it is not necessary to decrease the duty ratio further so that the processing returns to step S1. In step S3, if NO (the duty ratio area D is not smaller than ⅛), the processing proceeds to step S4. In step S4, the area t of counting the blinking is incremented.

Further, in step S5, it is decided whether or not the counting area t of counting the blinking time has passed a prescribed time tn according to the value stored in the area n of counting the number of times of changing the duty ratio. Specifically, it is decided whether or not the counting area t has passed the prescribed time t0 corresponding to the initial value n=0 when the duty ratio in not entirely changed (the duty ratio remains ½), time t1 corresponding to n=1 when the duty ratio is changed once (from ½ to ⅓), and t2 corresponding to n=2 when the duty ration is changed twice (from ⅓ to ¼).

Instep S5, if NO (t has not passed tn), it is not necessary to change the duty ratio. Therefore, the processing returns to step S1. In step S5, if YES (t has passes tn), the processing proceeds to step 36. In step 36, the duty ratio D is changed to that corresponding to the number of changing the duty ratio namely from ½ to ⅓ when n=1, from ⅓ to ¼ when n=2, and from ¼ to ⅛ when n=3. Thus, the duty ratio is reduced stepwise according to elapse of he blinking time to save the power consumption. Thereafter, the counting area n of the number of time of changing the duty ratio is incremented. The processing returns to step S1.

In step S1 if NO (the On operation signal S2 is not issued) the processing proceeds to step S8. In step S8, it is decided whether or not the ON operation signal has changed, i.e. the switch SW is turned off so that the ON operation signal S2 is stopped. If YES (the ON operation signal has been changed) in step S9, t is set at 0, D is set at ½ and n is set at 0. Thereafter, the processing returns to step S1. If NO (the ON operation signal S2 has not changed), the processing immediately returns to step S1.

In the embodiment described above, when the duty ratio is decreased to ⅛ which is the minimum value within the range where the hazard lamp 102 can be visually recognized, the duty ratio was fixed to ⅛. However, when the blinking of the duty ratio of ⅛ succeeds for a certain time, under the decision that the remaining quantity is almost zero, the blinking of the hazard lamp may be stopped.

In the embodiment described above, the hazard lamp was taken as the lamp load. However, since a winker may be caused to blink when the vehicle is parking, the invention can be also applied to the winker.

In the embodiment described above, although the duty ratio of the driving signal has been decreased in order to reduce the power to be supplied to the hazard lamp, the voltage to be supplied to the hazard lamp may be stepwise reduced to save the power consumption.

In the embodiment described above, the hazard lamp 102 was subjected to stepwise power saving in the prescribed times t0, t1 and t2 at regular intervals both while the engine stops and while the engine is operating. However, since the generator ALT generates power while the engine is operating, the remaining quantity of the in-vehicle battery will not decrease so greatly as compared with when the engine stops. Therefore, while the engine stops, the hazard lamp may be subjected to the stepwise power saving when the blinking time of the hazard lamp has passed the prescribe times (t0+Δt), (t1+tΔ) and (t2+tΔ) which are longer than the prescribed times t0, t1 and t2 when the engine stops. This is more efficient to avoid excessive power saving.

What is claimed is:

1. An apparatus for controlling a power supply to be used in a vehicle for causing a lamp load to blink with power supplied from one of an in-vehicle battery and a generator, comprising:

power decreasing means for stepwise decreasing power to be supplied to said lamp load whenever a blinking time of said lamp load passes a plurality of prescribed times.

2. The apparatus according to claim 1, wherein said lamp load is caused to blink by a pulse-like power source voltage, and said power decreasing means comprises duty ratio decreasing means for stepwise decreasing a duty ratio of the pulse-like voltage whenever the blinking time of said lamp load passes the plurality of prescribed times.

3. The apparatus according to claim 2, wherein said duty ratio is decreased to a minimum value enough to recognize the lamp load visually.

4. The apparatus according to claim 1, wherein said lamp load is a hazard lamp.

5. The apparatus according to claim 1, wherein said lamp load is a winker.

6. The apparatus according to claim 2, wherein said duty ratio is decreased in a geometric progression.

\* \* \* \* \*